June 9, 1959
B. R. CLAY
2,890,330
SIGNAL AMPLIFYING SYSTEMS
Filed March 23, 1953
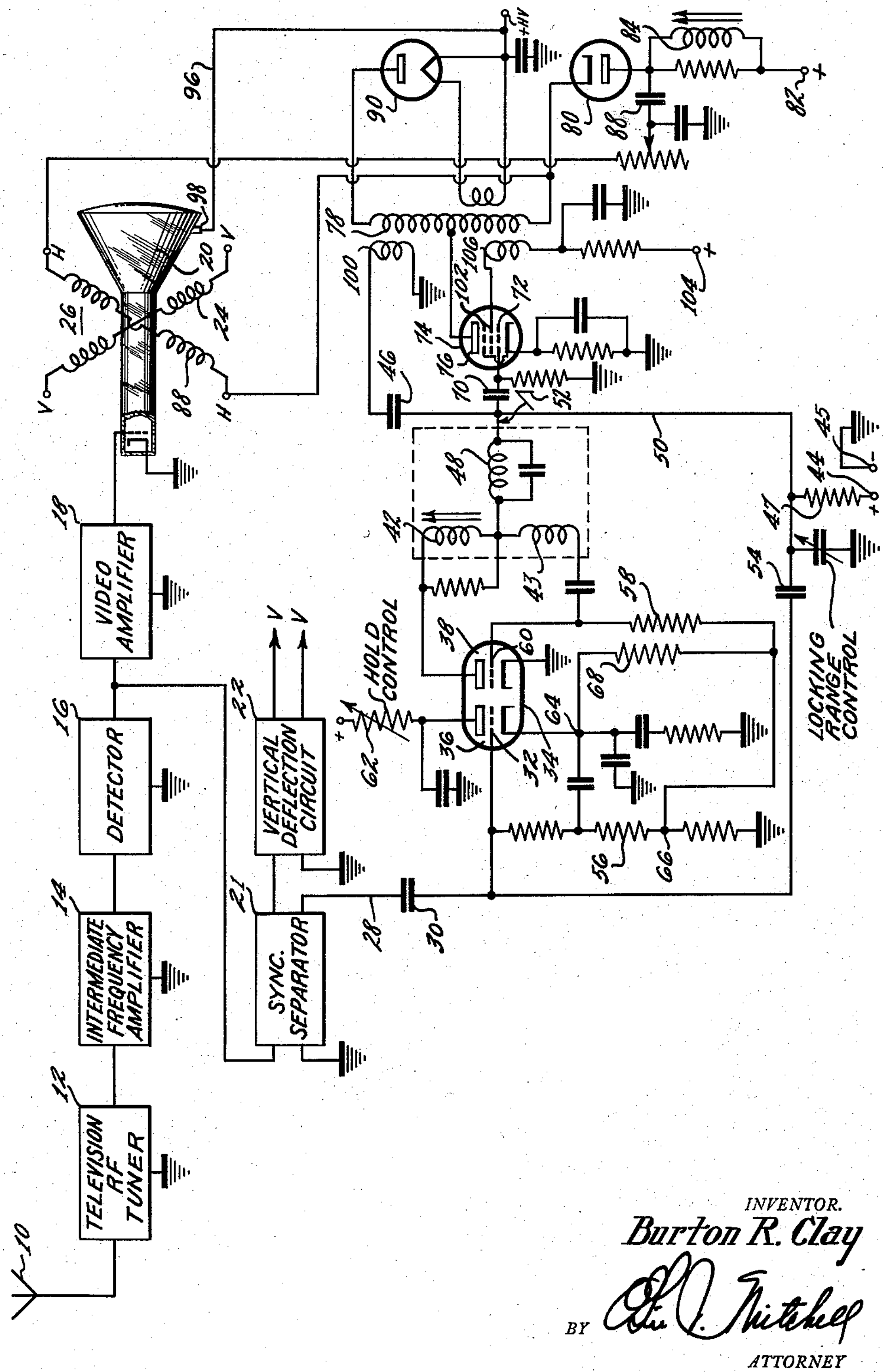
INVENTOR.
Burton R. Clay
BY [signature]
ATTORNEY United States Patent Office 2,890,330

Patented June 9, 1959

2,890,330

SIGNAL AMPLIFYING SYSTEMS

Burton Ross Clay, Woodbury, N.J., assignor to Radio Corporation of America, a corporation of Delaware Application March 23, 1953, Serial No. 344,141

The terminal fifteen years of the term of the patent to be granted has been disclaimed 4 Claims. (Cl. 250—27)

The present invention relates to improvements in signal amplifying systems, and more particularly to improvements in signal amplifying systems of the type designated to handle periodically recurring signal waveforms at relatively high power levels.

One aspect of the present invention relates to improvements in signal amplifying systems of the type employed in cathode ray beam deflection systems. In this regard the present invention deals with improved circuit means for increasing the efficiency and stability of cathode ray beam deflection systems, particularly of the wide angle deflection variety which require relatively large amounts of signal power.

In the electronic art, the occasion arises quite frequently where a rather large amount of signal power is required at a predetermined signal waveform. In such cases, the desired signal waveform is often developed at a low power low level signal generating means and applied to a power amplifying instrumentality which is capable of delivering considerable signal power at a possible sacrifice of voltage gain. It is sometimes found that the inherent characteristics of a particular power amplifying instrumentality requires appreciable driving current. This requirement taken in combination with a high impedance signal source capable of delivering only moderate amounts of signal driving power may result in certain signal waveform distortion which may upon occasion be of serious proportion. For a given type power amplifying instrumentality to be employed in the development of a given quantity of signal power at a low distortion level, it may, therefore, become necessary to supply a more costly signal driving source having a lower output impedance. An alternative to this is, of course, to provide means for reducing the power driving requirements of the power amplifier instrumentality for a given power output level. It is with this latter approach with which the present invention is concerned.

In the television art, for example, it is commonplace to develop rather large signal powers in the electromagnetic deflection of the cathode ray beam in a picture reproducing kinescope. In such circuits it is common practice to develop the deflection waveform, usually of sawtooth shape, by a blocking oscillator multivibrator or sawtooth discharge tube circuit. The signal waveform is then capacitively coupled, in most cases, to an electron discharge tube, whose anode circuit is transformer coupled to a deflection yoke of suitable design. It is the purpose of this electron discharge tube to provide considerable deflection power to the deflection yoke in order to accomplish the required electron beam scanning action. As cathode ray beam picture tubes or kinescopes increase in size due to the public demand for larger television pictures, the power requirements for beam deflection increase too. Power requirements for cathode ray beam deflection increase even further in horizontal deflection circuits in which it is common practice to rectify the positive going excursions of deflection signal waveforms for the development of high D.C. potential power required for electron beam acceleration in the kinescope. Again, such additional power requirements increase with kinescope tube size.

It is also quite generally recognized that as deflection signal power output requirements increase, especially in the horizontal deflection systems, the circuit costs increase quite rapidly. Among the various factors contributing to higher circuit costs in higher power deflection circuit systems is that of either employing a more costly deflection output tube, having a higher mutual conductance at a given plate resistance or providing, as mentioned above, a lower impedance of driving deflection waveform. In television receiving systems of the home instrument variety, where blocking oscillators, multivibrators, etc. are used as deflection driving sources, the demand for greater driving power may result in a reduction in operating stability of the driving oscillator or multivibrator.

It is, therefore, an object of the present invention to provide an improved signal amplifying circuit which requires a minimum of driving power to provide large signal power output.

It is still another object of the present invention to provide an improved power amplifying system which is capable of delivering considerable signal power at a minimum signal distortion.

It is further an object of the present invention to provide an improved signal amplifying system which realizes the full power handling capabilities of a given electron discharge tube type.

It is further an object of the present invention to provide an improved cathode ray beam deflection circuit which is eminently suited for wide angle high power deflection without sacrificing deflection linearity.

It is a still further object of the present invention to provide a suitable, low cost, yet highly efficient, cathode ray beam deflection signal generation and amplifying system which is suited for application in deflection systems requiring a high degree of signal linearity at a considerable power level.

In the realization of the above objects and features of advantage, the present invention, in one of its more general embodiments, provides a power amplifying device in which a portion of the amplified signal is serially added to the signal employed to drive the power amplifier.

It is contemplated in the practice of the present invention that the serial addition of a regeneratively related signal to the driving signal may be accomplished at the control electrode of the power tube or accomplished by imposing the regenerative signal upon the screen electrode or other auxiliary control electrode in a multigrid power amplifier tube.

In the application of the novel principles of the present invention to sawtooth cathode ray beam deflection systems, employing a pentode type power output amplifier, means are provided for supplementing the sawtooth signal employed to drive the deflection output amplifier with a regenerative signal component. This regenerative component during the retrace portion of the deflection, corresponds to the natural retrace period of the electromagnetic deflection system coupled with the power output tube and, therefore, serves to key or otherwise stabilize the action of the sawtooth generator stage preceding the output amplifier. Additional and concomitant regeneration is achieved through the application of a portion of the deflection signal output to the screen electrode of the power output pentode.

Other objects and features of advantage of the present invention will be gleaned through a reading of the following specification, especially when considered in connection with the accompanying single figure of the drawing, in which is shown a combination block and schematic representation of a television receiving system embodying the novel features of the present invention.

Turning now to the drawing, there is shown at 10 a radio signal receiving antenna, signals from which are applied to a superheterodyne type television RF tuner 12, well known in the art. The intermediate frequency version of the incoming radio frequency signal is applied to an intermediate frequency amplifier 14, whose output signals are in turn coupled to a signal detector or demodulator circuit 16. The demodulated video signal provided by detector 16 is then applied to a video amplifier circuit 18 whose developed output signal is applied to the kinescope 20 for modulation of the electron beam therein. In further accord with well known television receiving circuit techniques, the composite video signal provided by the detector 16 is applied to a sync separator circuit 21 whose function it is to separate from the composite video signal the scanning synchronizing components. Vertical synchronizing signal components, as provided by the sync separator circuit 21, are applied to a vertical deflection circuit 22 whose output terminals V—V are designated for connection to the terminals V—V of the vertical deflection winding 24 of the electromagnetic deflection yoke 26.

In the embodiment of the present invention, shown in the figure, the separated horizontal synchronizing signal components are conveyed, via circuit path 28 and coupling capacitor 30, to the control electrode 32 of the left hand tube section of the tube envelope 34. The left hand tube section of the envelope 34 will be designated as tube 36, whereas the right hand section of the envelope 34 will be designated as tube 38. In practice, the tubes 36 and 38 may be in separate envelopes. It will be recognized that tubes 36 and 38 are connected in a well known blocking oscillator-automatic frequency control sawtooth deflection circuit of a type described in an article entitled "A Single Tube A.F.C. for TV Deflection Systems," by John A. Cornell, appearing in the Radio Television News, for January 1950, page 58. The tube section 38 in conjunction with transformer windings 42 and 43 operates as a typical blocking oscillator circuit. The power or anode power supply potential for the tube 38 is derived from the positive power supply terminal 44 whose negative terminal 45 is indicated as being at circuit ground. A sawtooth charging capacitor 46 is connected from the upper terminal of resistor 47 to ground potential. A resonant circuit 48 placed in series with the circuit path 50 is tuned to a frequency substantially equal to the intended operating frequency of the blocking oscillator 38. The stabilizing action of this tuned circuit is described in the above-referenced article appearing in the Radio Television News.

In further accord with the well known operation of the blocking oscillator-automatic frequency control circuit employing tubes 36 and 38, a portion of the sawtooth voltage 52 developed at the ungrounded terminal of capacitor 46 is fed back via capacitor 54 to the control electrode 32 of discharge tube 36. It is here that the incoming synchronizing signal is compared with the trailing edge of the sawtooth waveform 52 to provide more or less conduction in the tube 36 as a function of phase synchronism between the sawtooth waveform 52 and the arriving synchronizing signals. The resulting voltage appearing along the tapped grid leak resistor 56, due to grid leak current, is coupled via resistor 58 to the control electrode 60 of tube section 38. It will be seen, therefore, as is described in the above-referenced article, that the frequency of the blocking oscillator based upon tube 38 will be governed by the automatic frequency control signal applied to the control electrode 60 by the resistor 58. Variable resistor 62 in the anode circuit of the tube 36 acts as a frequency or hold control by providing means for controlling the average current flow through the discharge tube 36. Control of the current through the discharge tube 36 permits control of the voltage developed at the cathode 64 and hence the voltage available at tap 66 of resistor 56 by merit of the shown connection of resistor 68.

In further accord with well known practice, the developed sawtooth waveform 52 is coupled via capacitor 70 to the control electrode 72 of a power output pentode 74. The anode 76 of the pentode discharge tube 74 is connected with an auto transformer 78 whose lower extremity is connected with cathode of a damping and power recovery diode 80. Anode power supply for the pentode 74 is derived from the positive power supply terminal 82 through a linearity control inductor 84 connected with the anode of the diode 80. A power recovery B boost charge storing capacitor 88 is connected between the anode of the diode 80 and one terminal of the horizontal deflection yoke winding 88. The other terminal of the horizontal deflection yoke winding is connected with the cathode of the diode 80 in accordance with well known practice.

In still further accordance with well known techniques, the upper extremity of the auto transformer 78 is connected with the anode of a high voltage rectifier 90. The high voltage developed at the anode of the rectifier is in a conventional manner connected via circuit path 96 to the ultor or beam accelerating anode 98 of the kinescope 20. The general operating principles of the power recovery high voltage generating deflection output stage based upon the pentode 74, is discussed in detail in the United States Patent 2,536,838, issued January 2, 1951, entitled "High Efficiency Cathode Ray Beam Deflection Systems," by Edwin Clark.

According to the present invention, instead of connecting the ground potential terminal of capacitor 46 directly with circuit ground, as has been the prior art practice, the capacitor 46 is connected with ground through feedback winding 100 inductively coupled with the auto transformer primary winding 78.

In further accordance with the present invention, the screen electrode 102 of pentode 74 instead of being connected with a fixed positive power supply voltage, as in most prior art arrangements, the screen electrode 102 is coupled with a positive biasing potential derived from terminal 104 through a feedback winding 106 also magnetically coupled with the auto transformer primary winding 78. In accordance with the present invention, the electrical phase of the feedback signals induced in windings 100 and 106 and applied respectively to the control electrode 72 and screen electrode 102 of pentode 74, is such as to produce a degree of regeneration in the pentode 74.

In the operation of the present invention the regeneration produced by the feedback of output signal energy to the control electrode and screen electrode of pentode 74 is such as to increase the input impedance of the pentode 74. By carefully adjusting the amount of feedback provided by the windings 100 and 106, either by controlling the number of turns in each winding or controlling the degree of magnetic coupling with the auto-transformer winding 78, the pentode 74 may be made to operate quite stably at a point just under self-sustained oscillation. Under such conditions, the power required from the blocking oscillator-automatic frequency control circuit based upon tubes 36 and 38 will be negligible. Moreover, the deflection cycle retrace period produced by the cut-off period of the pentode 74 will be much more sharply defined to the end of increasing the power operating efficiency of the pentode 74 and the associated power recovery type horizontal deflection system.

In this latter respect, it is well to note that in a strict sense the advantages flowing from the practice of the present invention, as shown in the illustrated embodiment, do not rest solely on the existence of positive or regenerative feedback. Actually, the negative going pulse portion of the fed back waveform to the grid 72 is of sufficient amplitude and duration to cut off anode-cathode current flow in tube 38. This renders the deflection waveform generator absolutely immune to noise during the cutoff period. In practice the negative pulse component endures for about 10% of the deflection cycle, therefore imparting noise immunity to the sawtooth generator for a guaranteed 10% of the deflection cycle.

It is important to observe that in the practice of the present invention it is not altogether necessary to provide regenerative feedback in the deflection output pentode 74 from both the feedback windings 100 and 106. It has been found that with a degree in reduction of operating efficiency the regenerative feedback to the screen electrode 102 from the winding 106 will in itself produce more efficient operation than prior art systems. However, due to limitation in the mutual conductance characteristics of the screen electrode in most present day commercially available power pentodes, it is found that regardless of the amount of feedback employed in the screen electrode circuit, a substantial improvement in operating efficiency and stability can be generally realized by supplementing screen electrode feedback by regenerative feedback to the control electrode circuit. It is important in the illustrated embodiment of the present invention to notice that the regenerative feedback to the control electrode circuit is accomplished in series with the sawtooth forming capacitor 46 instead of attempting to supply feedback voltage in shunt with this capacitor. This technique overcomes the inherent circuit losses which would necessarily follow from the application of regenerative feedback voltage in shunt with the capacitor 46.

Although the advantageous features of the present invention have been illustrated in connection with a sawtooth waveform power amplifying system, it is evident that the improved power amplifying means made possible by the present invention will find useful application in the amplification of signal waveforms other than simply those employed in cathode ray beam deflection circuits. Moreover, it should be realized that although the particular form of automatic frequency control sawtooth generating circuit shown in the drawing is eminently suited for use in connection with the improved power output amplifier system of the present invention, that other signal waveform generating circuits may be employed as driving sources for the improved power amplifier and still realize the advantages provided by the present invention.

What is claimed is:

1. In a cathode ray beam deflection circuit, the combination of: a first electron discharge tube having at least an anode, cathode and control electrode; a blocking oscillator transformer having a primary winding and a secondary winding; electrical connections between the extremities of said blocking oscillator primary winding and the anode and cathode of said first discharge tube; a capacitor connected from said first discharge tube control electrode and one terminal of said blocking oscillator secondary winding; an electrical connection from the other extremity of said blocking oscillator secondary winding and said first discharge tube cathode; a parallel resonant circuit comprising an inductor and capacitor resonant in the range of the operating frequency intended for said blocking oscillator transformer; an electrical connection between one extremity of said resonant circuit and said blocking oscillator transformer primary winding; a positive power supply terminal referenced with respect to said first discharge tube cathode; impedance means connected from said positive power supply terminal to the other extremity of said resonant circuit; a sawtooth discharge capacitor having one terminal thereof connected with the power supply extremity of said resonant circuit; an inductor connected between the other extremity of said discharge capacitor and said first discharge tube cathode; a second electron discharge tube having at least an anode, cathode and control electrode; transformer means connected between said second electron discharge tube anode and cathode, said transformer means being so physically situated with respect to said inductor as to conditionally induce a feedback voltage in said inductor which is regeneratively related to operating currents in said second electron discharge tube; and signal coupling means connected from said sawtooth discharge capacitor to said control electrode.

2. A cathode ray beam deflection circuit according to claim 1, wherein said second electron discharge tube includes a screen electrode and wherein there is additionally provided regenerative feedback means coupled between said output transformer and said screen electrode.

3. In a cathode ray beam deflection signal generating system, the combination of: a sawtooth waveform generating circuit including a sawtooth discharge capacitor across which is developed a periodically recurrent sawtooth deflection waveform; a deflection waveform amplifier adapted for driving by said sawtooth deflection waveform and including an electron discharge tube having at least an anode, cathode, control electrode and auxiliary electrode, an output load circuit connected between said anode and said cathode; means coupled to said output load circuit for developing a signal waveform regeneratively related to the control characteristics of said control electrode; and circuit means connected between said output load circuit and said sawtooth discharge capacitor for superimposing said regeneratively related signal waveform upon the sawtooth waveform developed across said sawtooth discharge capacitor to form a corrected deflection signal; signal coupling means connected between said sawtooth discharge capacitor and said control electrode for driving said deflection waveform amplifier with said corrected deflection signal; and means coupled with said output load circuit and said auxiliary electrode for imposing on said auxiliary electrode a signal voltage regeneratively related to the control characteristics of said auxiliary electrode.

4. In a cathode ray beam deflection signal generating system, the combination of: a sawtooth waveform deflection generating circuit including a sawtooth discharge capacitor having a first and a second extremity, said first extremity being connected with a circuit ground; a deflection power amplifier comprising an electron discharge tube having at least an anode, cathode, control electrode, and an auxiliary electrode; inductance means connected between said anode and said cathode and including anode power supply means in series therewith to define in part an output circuit for said power amplifier; a first winding magnetically coupled to said inductance means and serially connected between said sawtooth discharge capacitor first extremity and said circuit ground; a second winding means inductively coupled to said inductance means and connected between said auxiliary electrode and a source of ground referenced bias potential for said auxiliary electrode; signal coupling means connected between the second extremity of said sawtooth discharge capacitor and said discharge tube control electrode for driving said output amplifier with the signal appearing at the second extremity of said sawtooth discharge capacitor; and a cathode ray beam deflection waveform power utilization means electrically coupled with said inductance means.

References Cited in the file of this patent

UNITED STATES PATENTS

| | | |
|---|---|---|
| 2,126,243 | Busse et al. | Aug. 2, 1938 |
| 2,153,217 | Mark | Apr. 4, 1939 |

(Other references on following page)

UNITED STATES PATENTS

| | | |
|---|---|---|
| 2,196,825 | Geiger | Apr. 9, 1940 |
| 2,237,425 | Geiger et al. | Apr. 8, 1941 |
| 2,544,213 | Bennett et al. | Mar. 6, 1951 |
| 2,545,346 | Edelsohn | Mar. 13, 1951 |
| 2,566,432 | Sziklai | Sept. 4, 1951 |
| 2,579,627 | Tourshou | Dec. 25, 1951 |
| 2,589,299 | Setchell | Mar. 18, 1952 |
| 2,622,228 | Jones | Dec. 16, 1952 |
| 2,624,007 | Seur et al. | Dec. 30, 1952 |
| 2,627,052 | Helpert et al. | Jan. 27, 1953 |
| 2,654,050 | Reinhard | Sept. 29, 1953 |
| 2,760,110 | Janssen | Aug. 21, 1956 |

FOREIGN PATENTS

| | | |
|---|---|---|
| 813,576 | Germany | Sept. 13, 1951 |